United States Patent

[11] 3,589,177

| [72] | Inventor | Angelo Louis Merlo<br>2115 E. Long Lake Road, Troy, Mich. 48084 |
|---|---|---|
| [21] | Appl. No. | 764,566 |
| [22] | Filed | Oct. 2, 1968 |
| [45] | Patented | June 29, 1971 |

[54] COMBUSTION MICROWAVE DIAGNOSTIC SYSTEM
12 Claims, 7 Drawing Figs.

[52] U.S. Cl. .................................................. 73/116, 324/16 T, 324/58.5 C
[51] Int. Cl. ........................................................ G01m 15/00
[50] Field of Search .......................................... 73/116; 324/15, 16, 58 C, 58.5; 333/95; 343/894, 703

[56] References Cited
UNITED STATES PATENTS
| 2,491,418 | 12/1949 | Schlesman | 324/58.5 (C) |
| 2,520,604 | 8/1950 | Linder | 324/58.5 (C) |
| 2,959,732 | 11/1960 | Lindberg, Jr. | 73/116 UX |
| 2,962,654 | 11/1960 | Wilson | 324/16 X |
| 3,030,799 | 4/1962 | Hopkins | 73/116 X |

Primary Examiner—Jerry W. Myracle

ABSTRACT: Systems to resonate the combustion chamber of internal combustion engines at radio frequencies, at all available engine r.p.m. are disclosed. Methods, to employ radio frequency resonances for mechanical and electrical measurements within and near the combustion chamber, at all available engine r.p.m., are also disclosed. The system comprises a tunable source of coherent radio frequency energy and a hybrid transmission line to convey the radio frequency energy into the combustion chamber and also to detect the energy reflected from the combustion chamber. The methods, to perform mechanical and electrical measurements within the combustion chamber are ones that correlate the change in the number and properties of the resonances with the continuously changing properties of the combustion chamber.

3,589,177

INVENTOR Angelo L. Merlo

COMBUSTION MICROWAVE DIAGNOSTIC SYSTEM

This invention relates to a diagnostic system for the combustion chamber of internal combustion engines. More particularly it relates to a novel means for using electromagnetic radiant energy in the ultrahigh and microwave frequency range to sense and measure the movement and the behavior of parts as well as combustion phenomena within and near combustion chamber during high-speed operation of engines.

The combustion chamber of an internal combustion engine is a hot and hostile environment and previous methods to perform dynamic measurements within the combustion chamber during high-speed engine operation have necessitated the use of elaborate and carefully adjusted equipments. In certain cases it has been necessary to modify the engine in order for experiments to be performed, therefore past methods have not gained widespread use.

It is an object of this invention to provide a convenient means to sense the high-speed chemical ionization reactions taking place during the combustion cycle, without modifications to engines.

Another object of this invention is to provide a convenient means to sense the high-speed relationships between the ignition event and the resultant chemical reactions in the combustion chamber. This is accomplished by measurements of resonances.

Another object of this invention is to provide means to permit the spark plug to be used as a coupling antenna to pass into the combustion chamber coherent, controlled, externally generated electromagnetic energy in the ultrahigh and microwave frequency range, during high-speed operation of the engine.

Another object of this invention is to provide means to utilize the electromagnetic energy resonance phenomena within the combustion chamber to detect high-speed mechanical displacements.

Another object of this invention is to provide the means whereby high-speed moving parts within the combustion chamber may be tracked by electrically following the electromagnetic energy resonances.

Another object of this invention is to provide the means to locate Top Dead Center during high-speed engine operation by means of electromagnetic energy resonances.

Another object is to provide the means to sense during high-speed operation the chemical reactions, through use of the different available electromagnetic energy resonances.

Another object is to provide a means to control engine efficiency during high-speed engine operation by employing the electromagnetic energy resonances as a standard.

Another object is to provide means to identify the direction of high-speed piston motion by employing the electromagnetic energy resonances and their harmonic components of microwave video detection.

Another object is to provide means to determine high-speed engine angular velocity by gauging the time duration of electromagnetic energy resonances.

Another object is to provide means during high-speed engine operation to separate multiple electromagnetic energy resonances by modulation of the electromagnetic energy source.

Another object is to provide, through the measurement of resonances, means during high-speed engine operation to sense the emissions which occur from discharges and other plasma processes.

Another object is to provide means during high-speed engine operation to track by time gating the electromagnetic energy resonances occurring within the combustion chamber.

Other objects and advantages of the invention will become apparent from the following detailed description taken in connection with the accompanying drawings, in which:

FIG. 1—is a general view of the apparatus.

FIG. 2—is a detailed view of the spark plug coupler.

FIG. 3A—shows the nature of the microwave video detected resonances with low excitation frequency.

FIG. 3B—shows the nature of the microwave video detected resonances at a higher excitation frequency.

FIG. 4—an illustration showing the direction of electric fields for two well-known resonant modes.

FIG. 5—an illustration showing a preferred means to perform spark plug coupling.

FIG. 6—a system for monitoring the ignition angle for any engine r.p.m.

While the invention is susceptible of various modifications and alternative arrangements, I have shown in the drawings and will herein describe in detail the preferred embodiments. It is to be understood, however, that I do not intend to limit the invention by such disclosure for I aim to cover all modifications and alternative arrangements following within the spirit and scope of the invention as in the appended claims.

FIG. 1 shows a general view of the apparatus. The spark plug 1 is shown enclosed by a cylindrical shield 2 which forms the outer conductor of a coaxial transmission line. Electromagnetic energy passes through this coaxial line in the process of entering the combustion chamber 3 which is a cylindrical enclosure forming an electromagnetic wave cavity. This cavity, which is also the combustion chamber, is tunable by virtue of the motion of the piston 4 within the cylinder wall 5. The coaxial transmission line having cylindrical outer conductor 2 in FIG. 1 utilizes a low loss dielectric filling between the outer 2 and inner 6 conductor. This dielectric filling is exposed 7 at the top end and forms an effective ignition spark insulator to ground for the ignition lead 8. Electromagnetic energy generated by the source 9 enters a rectangular waveguide section 10 through the coax to waveguide adapter 11. This energy moves within the waveguide section 10 to the coax section 2. A portion also passes beyond coax section 2 to the electromagnetic energy detector 12 to bias this device into its most sensitive operating range. A very small portion escapes through insulator 7. The portion which escapes through insulator 7 is minimized by construction of this part of the coax section to have a high impedance to the flow of energy. This is accomplished by increasing the ratio formed by the outer diameter of the coax divided by the diameter of the center conductor 6. In FIG. 1 the electromagnetic energy source 9 has been selected to be a reflex klystron, this invention is not restricted to this type of electromagnetic energy source. The reflex klystron however is a convenient source for frequency and amplitude types of modulation through the klystron power supply 13 which supplies biasing potentials to the klystron 9.

As the piston 4 moves up and down within the cylindrical Inc., 5, predictable electromagnetic energy resonant absorptions occur. The subject of resonances is discussed on page 170 of the book titled *Understanding Microwaves* by John F. Rider publisher, Inc., New York. These absorptions appear at the detector 12 as amplitude variations of detected energy. As the piston 4 proceeds from the extreme top of the stroke towards the extreme bottom of the stroke absorptions due to the $TE_{111}$, $TM_{011}$, $TE_{010}$ etc. modes appear according to a well established theory concerning this electromagnetic phenomena. The definition of modes can be found in the *Waveguide Handbook*, MIT Rad. Lab. Series vol. 10, edited by N. Marcuvitz, copyright 1951 by McGraw Hill Book Co. Inc., also in the *Microwave Engineers Hand Book* published by Horizon House-Microwave Inc. 1961—1962, pages TD–25 to TD–32 also pages TD–74 and TD–75. The resonances occur for particular positions of the piston dependent upon the geometry of the chamber, the frequency of the electromagnetic energy and the dielectric constant and the loss tangent of the dielectric materials existing within the chamber 3.

The absorption within the combustion chamber 3 appear as variations in voltage at the detector 12. The preamplifier 14 is utilized to increase the magnitude of the voltage which appears from the detector and also to institute filtering of the signals that appear from the detector with regards to the frequencies which are magnified and which are permitted to pass into the time gated amplifier 15.

The time gated amplifier 15 is an amplifier which only provides gain during the time of the occurrence of a resonance in the combustion chamber 3. For the purpose of this discussion the period during which the amplifier provides gain will be called the gate period. Information concerning the approximate time during which the gate period should appear is derived by using the ignition event as a reference. This event is picked up as a voltage from a 10-turn coil 16 molded in plastic and fastened to the rectangular waveguide section 10.

Consider FIG. 2, electromagnetic energy 17 moves down the rectangular waveguide 10 into the coax guide 2, through the plug insulator 21 into the combustion chamber 3. The rectangular waveguide section 10 is designed to be readily disconnected from the coax section 2 to permit the installation of the spark plug 1 by a screwing motion. After the plug has been installed the rectangular waveguide section 10 may then be connected with any convenient orientation with respect to the coax 2 section, by means of the nut arrangement 18, 19 and 20.

FIG. 2 shows a detailed view of the spark plug coupler which consists of the spark plug 1, coax section 2 and rectangular waveguide section 10. The particular spark plug coupler design of FIG. 2 has the coax outer conductor 2 fastened to the metal shank of the spark plug, by means of high temperature solder or by brazing. The rectangular waveguide section 10 slips over the coax section 2 which permits electromagnetic energy to move down the waveguide and is fastened together by a threaded nut arrangement 18, 19 and 20. This arrangement permits the waveguide section to be oriented in any direction with respect to the axis of the coax section. This feature is useful because it permits a means to avoid the many interfering parts located near the spark plug openings of conventional engines.

FIG. 3A shows the character of the $TE_{111}$ resonance as it can be observed using an oscilloscope connected to the output of the preamplifier 14 during the operation of an engine. The nature of the resonant absorptions are shown during the combustion, exhaust, intake and compression periods of a four-stroke cycle 22, 23, 24, 25.

The position of occurrence, with respect to top dead center of the resonance, is determined by the geometry of the cylinder, the wavelength of the exciting energy and the contents of the bore. The phase of the absorption signal with respect to time, or mechanical position of the piston, as seen by the oscilloscope depends upon the direction of travel of the piston. A 180° phase reversal occurs between descending and ascending resonances. The magnitude of the absorption signal is dependent upon the loss tangent of the materials which occupy the volume of the bore. FIG. 3B shows the effects upon the absorptions by the materials within the bore 3 during the four parts of the four-stroke cycle 26, 27, 28, 29.

Note that it is possible to excite different resonant modes for the same dynamic position of the piston in the bore by changing the exciting frequency. The character of the magnitude of the absorptions will differ between these modes due to the differences in the electric field configuration between different modes within the same geometry.

Figure 4:
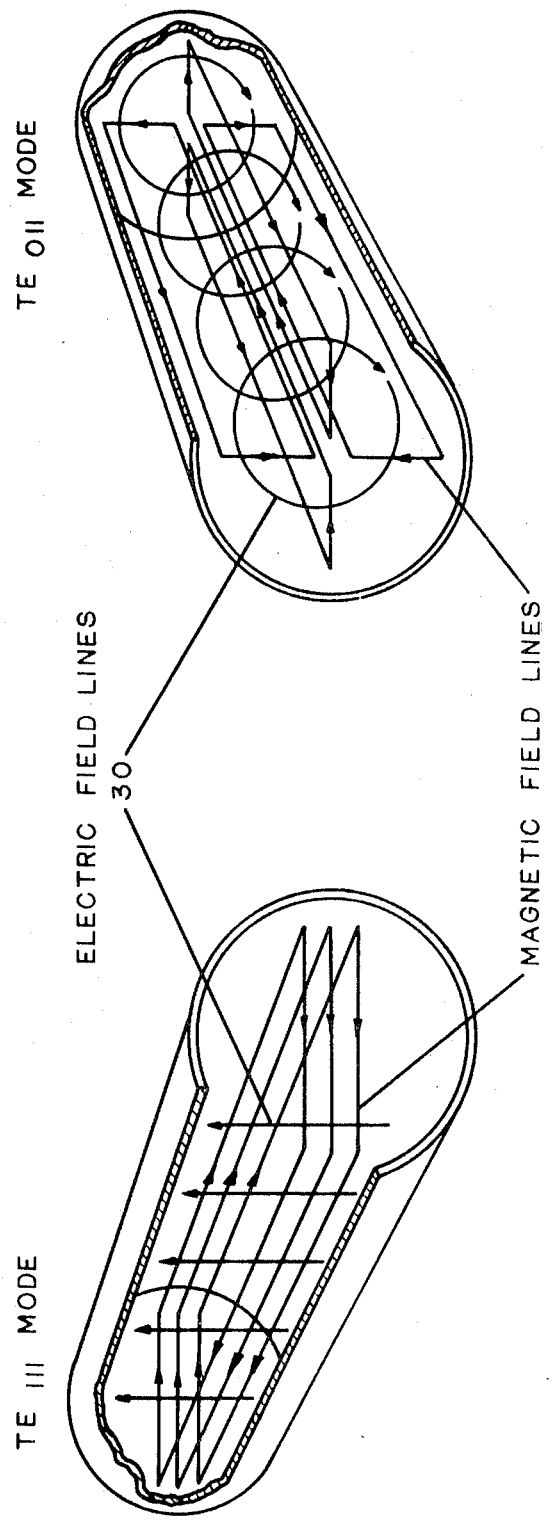

FIG. 4 illustrates the direction of the electric fields 30 for two well-known modes, the $TE_{111}$ and the $TE_{011}$. The $TE_{111}$ electric field is perpendicular to the axis of the cylinder bore and the $TE_{011}$ electric field 30 is concentric with the same axis.

By a suitable selection of the different resonant mode electric field configurations available—a detailed study of the volume space within the cylinder bore can be made during engine operation.

Figure 1:
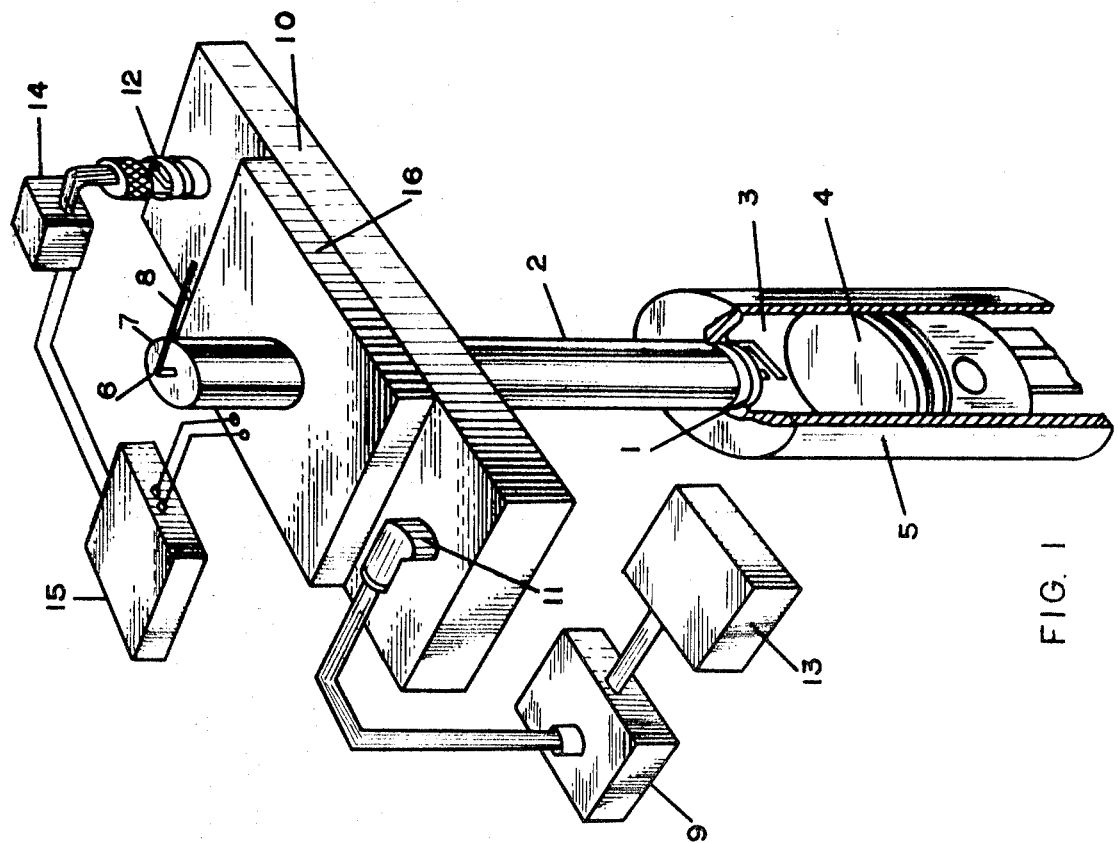
Figure 2:
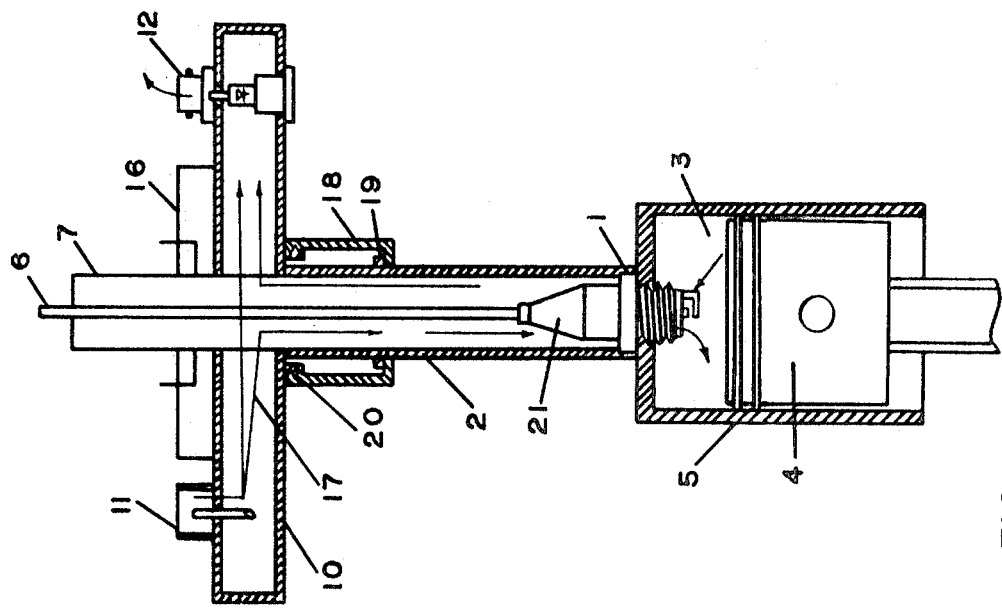
Figure 5:
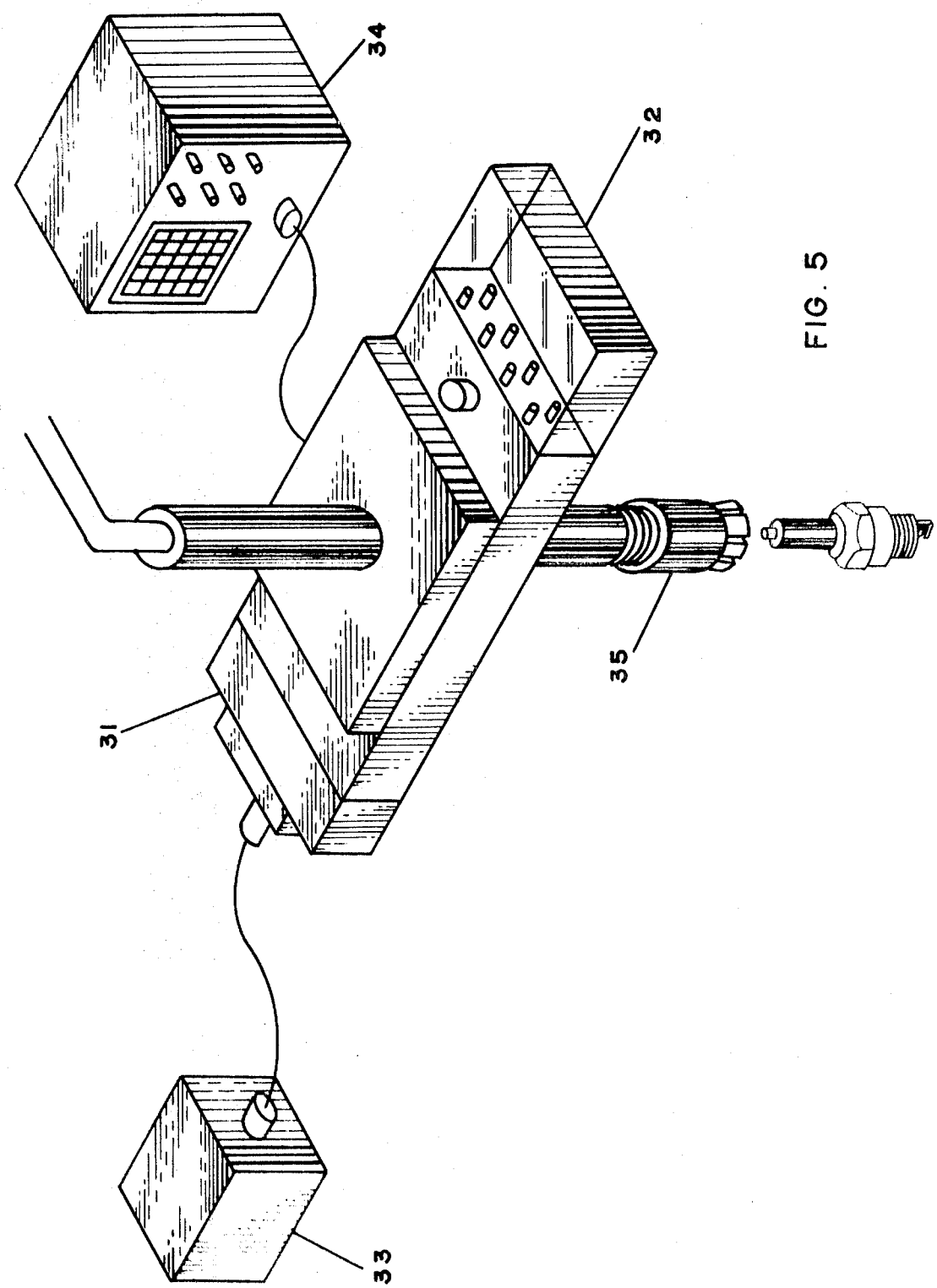

FIG. 5 shows a preferred method to construct the means to couple energy into the cylinder bore. This method incorporates within the rectangular waveguide section 10, shown by FIGS. 1 and 2 a semiconductor electromagnetic wave oscillator 31, and also the amplifier electronics in the form of monolithic circuits 32. The advantages of this construction technique is that it will permit the use of very simple additional equipment, for example, a low voltage direct current power supply 33, and an oscilloscope 34.

The means to connect the coupler to the spark plug 35 is one which will permit a snap-on or screw on connection so that the spark plug will not have to be removed. A snap-on clamp with a screw-type lock is shown as 35.

Figure 3A:
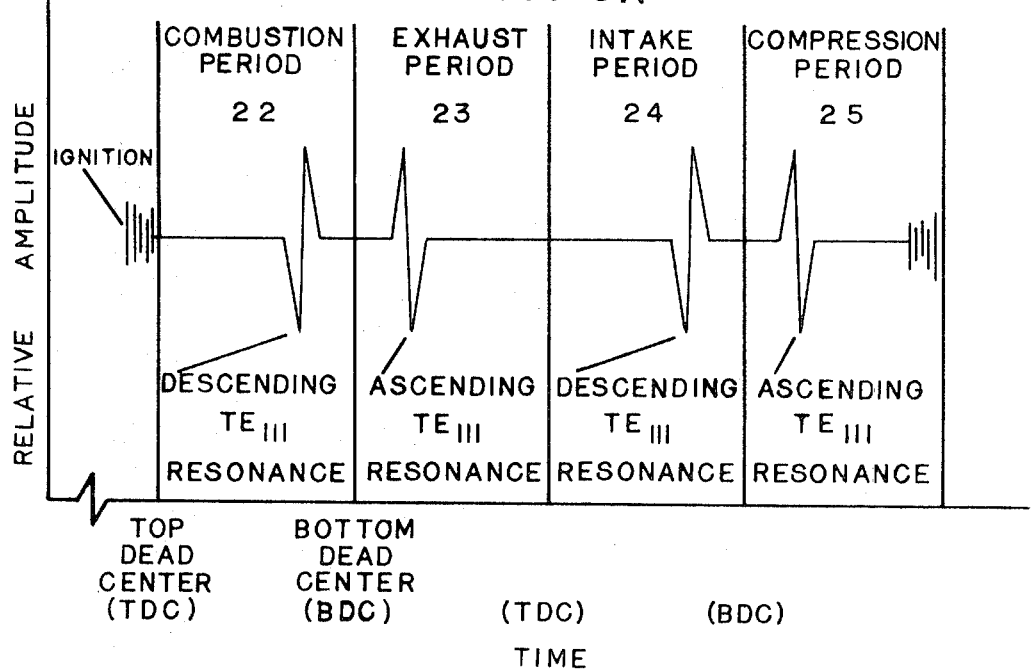
FIG. 3A shows a single resonance which can be made to occur by increasing the wavelength of the exciting energy to sufficient magnitude. For example; a 3-inch cylinder bore with a piston stroke of about 1.75 inch can develop a single $TE_{111}$ resonance when excited by 4 GHz.
Figure 3B:
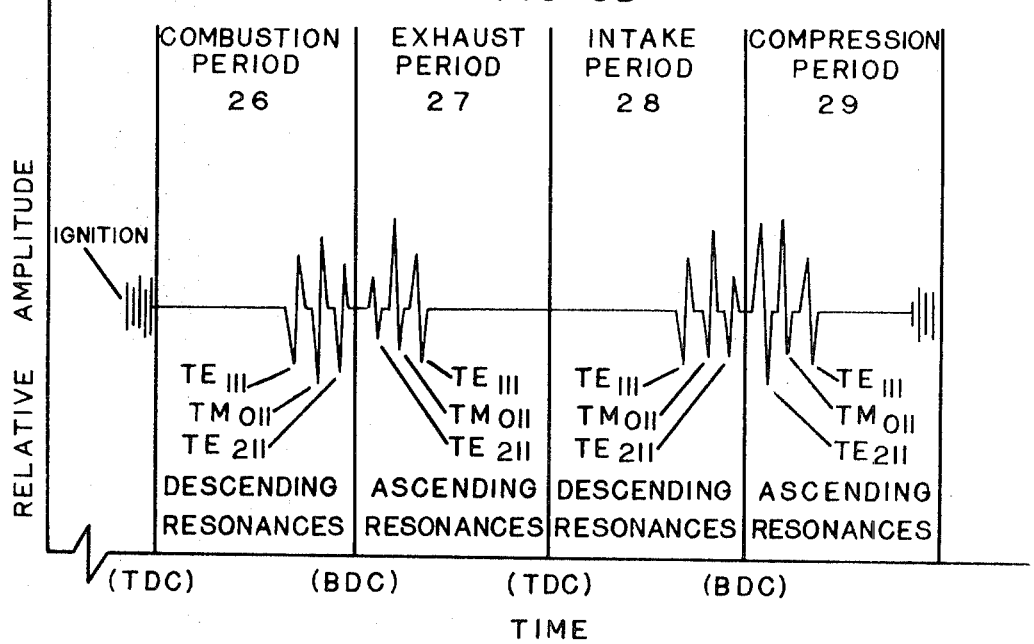
FIG. 3B shows the additional resonances that can be excited by increasing the frequency beyond 4 GHz. for the same bore and stroke shown for FIG. 3A. The magnitude of the resonance becomes altered depending upon the period during which it is observed 26, 27, 28, 29.
Figure 6:
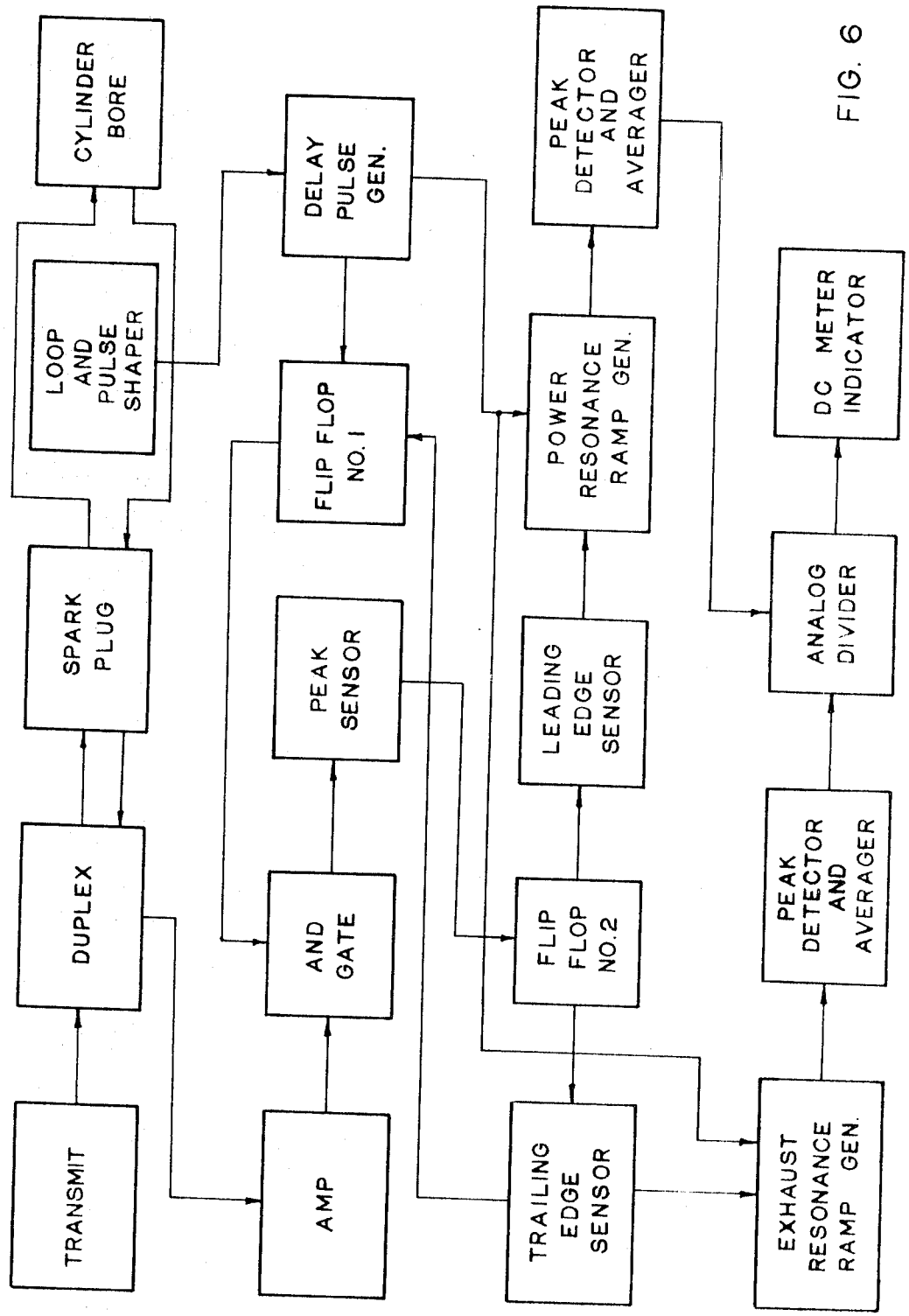

FIG. 6 shows the block diagram of a system to monitor ignition firing angle by means of resonances. This system makes use of the fact that the mechanical position of the piston for a resonant absorption has a fixed mechanical relationship with respect to the TDC of piston travel. It therefore serves as an additional reference from which ignition and cam timing events can be measured. The system can be described as follows. Electromagnetic energy generated at TRANSMIT FIG. 6 proceeds through the DUPLEX (duplexer) and SPARK PLUG into the CYLINDER BORE. The transmitter frequency is lowered sufficiently to produce only the $TE_{111}$ resonance near the lower half of the stroke. The resonant event appears at the amplifier as an S-shaped voltage wave with respect to time as illustrated in FIGS. 3A. One resonance occurs during the combustion stroke and others during the exhaust, intake and compression strokes.

The AND GATE permits only the power and exhaust resonance to be processed by the system, however other suitable combinations of resonances may also be employed. The PEAK SENSOR permits sharp pulses to enter FLIP-FLOP No. 2 by removing the base line. The LOOP AND PULSE SHAPER picks up radiation generated by the spark event and electronically shapes the picked up signal to provide a steady and reliable trigger for the DELAY PULSE GENERATOR. The DELAY PULSE GENERATOR is a retriggerable monostable multivibrator, and it generates a pulse delayed sufficiently in time to avoid opening the AND GATE during the ignition event. The AND GATE is opened by FLIP-FLOP No. 1 whose "on" state is provided by the DELAYED PULSE GENERATOR and whose "off" state is triggered by the TRAILING EDGE SENSOR. Thus the AND GATE permits only the power resonance and exhaust resonance to be admitted to the PEAK SENSOR. The PEAK SENSOR permits FLIP-FLOP No. 2 to change state every time a power or exhaust resonance occurs. The power resonance triggers FLIP-FLOP No. 2 to create a rising leading voltage edge, and the exhaust resonance creates a falling trailing voltage edge. One such cycle occurs for 2 complete revolutions of the engine.

The DELAY PULSE GENERATOR triggers the beginning of a linear rising voltage in both the POWER RESONANCE RAMP GEN. and EXHAUST RESONANCE RAMP GEN. The LEADING EDGE SENSOR terminates the linear rise in voltage of the POWER RESONANCE RAMP GEN. and the TRAILING EDGE SENSOR terminates the linear rise in voltage of the EXHAUST RESONANCE RAMP GEN. PEAK DETECTOR AND AVERAGE units on the outputs of both ramp generators preserves and smooth the magnitude of the terminated voltage. The two resulting voltages are provided to the ANALOG DIVIDER and the resulting ratio provided as a smooth voltage to the DC METER INDICATOR which is calibrated in terms of ignition angle with respect to top dead center.

The ability to perform the ignition angle measurement is explained as follows:
LET
A = Peak power resonance ramp gen. voltage which is directly proportional to the elapsed time between the ignition event and the power resonance.

B = Voltage directly proportional to the elapsed time between the power resonance and the exhaust resonance.
C = Peak exhaust resonance ramp gen. voltage which is directly proportional to the elapsed time between the ignition event and the exhaust resonance.
K = A constant of proportionality directly related to engine r.p.m.
TA = Elapsed time between the ignition event and the power resonance.
TB = Elapsed time between the power resonance and the exhaust resonance.

$C = A + B$
$A = K[TA]$
$B = K[TA]$
$C = KTA + KTB$
$C/A = 1 + TB/TA$

The magnitude of $TA$ depends on both the ignition angle and r.p.m., however the magnitude of $TB$ depends only upon r.p.m. The ratio $C/A$ therefore is sensitive to ignition angle only and can be used to measure ignition angle with respect to top dead center directly.

What I claim to be new, novel and inventive by this disclosure is as follows:

1. Ultrahigh and microwave wavelength apparatus to permit radiation into internal combustion engines comprising, a coherent externally controlled energy source, a dielectrically loaded waveguide first adapter coupled to said source, said first adapter including a crystal detector and second adapter, a dielectrically loaded coaxial transmission line coupled to said second adapter, said line including a spark plug employed as a transmitting and receiving antenna for radiation by said source, combustion chamber being a resonant cavity coupled to said spark plug, said cavity including tuning by piston and chamber mechanical motions and gases and vapors, amplifier coupled to said detector, oscilloscope display coupled to said amplifier to permit measurements of tuning of said combustion chamber by said piston and chamber mechanical motions and gases and vapors throughout engine cycle at all available r.p.m.

2. Ultrahigh and microwave frequency apparatus to facilitate coupling into internal combustion engines comprising, a coherent externally controlled ultrahigh and microwave wavelength source, a flexible coaxial transmission line coupled to said source, a coax to waveguide adapter coupled to said transmission line, a dielectrically loaded waveguide section coupled to said adapter, said loaded waveguide section coupled to said adapter, said loaded waveguide section including waveguide to rigid coax adapter and crystal detector, a dielectrically loaded removable rigid coaxial transmission line coupled to said waveguide to rigid coax adapter including spark plug termination acting as an antenna on one end and including fittings to couple with said loaded waveguide section on the other end, said fittings including assembly nut to fasten and match said removable rigid coaxial transmission line to said loaded waveguide section and including sufficient dielectric loading material without outer conductor on said other end to prevent arcing from inner conductor to said loaded waveguide section, said inner conductor including diameter controlled to reduce leakage radiation, including said material positioned through said loaded waveguide to coax adapter, including said loaded waveguide section having maximum rotational freedom with respect to said rigid coaxial transmission line, a combustion chamber being a tunable resonant cavity coupled to said spark plug termination, including movable piston and mechanical parts and gases and plasma and vapors existing therein during high-speed operation, said movable piston and mechanical parts and gases and plasma and vapors tuning said tunable resonant cavity, a tunable amplifier coupled to said detector, display and recording and storage devices coupled to said amplifier to permit measurement of tuning of said combustion chamber by said movable piston and mechanical parts and gases and plasma and vapors.

3. In combination a radio transmitter, apparatus to facilitate coupling into an internal combustion engine and a combustion chamber acting as a tunable resonance cavity, a dielectrically loaded waveguide coupled to said transmitter including a crystal detector, a dielectrically loaded coaxial transmission line coupled to said combustion chamber, an adapter to couple said waveguide and said transmission line, a spark plug acting as a transmitting and receiving antenna coupling said transmission line into said combustion chamber, combustion chamber tuning by piston motion and mechanical motions and gases and vapors at all available r.p.m., said tuning detected by said detector.

4. Ultrahigh and microwave frequency apparatus to measure spark plug firing timing comprising, a coherent externally controlled energy source, a dielectrically loaded waveguide coupled to said source including waveguide to rigid coax adapter and crystal detector, a rigid dielectrically loaded coax transmission line coupled to said adapter including spark plug termination acting as a transmitting and receiving antenna at one end and means to couple to said adapter on the other end, said other end including loop to detect ignition pulses, combustion chamber of internal combustion engine being a tunable resonance cavity coupled to said spark plug, including movable piston, amplifier coupled to said detector, AND gate coupled to said amplifier, peak sensor coupled to said AND gate, flip-flop no. 2 coupled to peak sensor, said sensor detecting only power and exhaust resonances, delay pulse generator coupled to said loop, flip-flop no. 1 coupled to said generator, said flip-flop no. 1 coupled to said AND gate to turn said AND gate "on" following ignition pulse, leading edge sensor coupled to said flip-flop no. 2, trailing edge sensor coupled to said flip-flop no. 2, power resonance ramp generator coupled to leading edge sensor providing a voltage proportional to time between ignition and power resonance, exhaust resonance ramp generator coupled to trailing edge sensor, providing a voltage proportional to time between ignition and exhaust resonance, a separate peak detector and averager connected to each of said power and exhaust ramp generators, analog divider coupled to both of said separate peak detector and averager, DC meter indicator coupled to analog divider to indicate the ratio between ignition to exhaust resonance voltage divided by ignition to power resonance voltage, said ratio being proportional to firing angle.

5. The method of measuring the position, within the combustion chamber of an internal combustion engine, of the piston or mechanical parts, selectively, at all available r.p.m., comprising the steps of generating a externally controlled coherent ultrahigh and microwave radio frequency wave, radiating said wave into said combustion chamber, detecting a resonance mode of said wave reflected from said combustion chamber, changing the wavelength of said generated wave related to the resonance, continuously measuring the generated wavelength, comparing said measured wavelength with standard wavelengths measured with piston moved slowly, said standard wavelengths correlated with mechanical measurements.

6. The method of measuring the conductivity of flames, gases, vapors and materials within and near the combustion chamber of internal combustion engines, at all available r.p.m. comprising the steps of, generating an externally controlled coherent ultrahigh and microwave radio frequency wave, exciting resonance modes of said wave in said combustion chamber, changing the wavelength of said wave in combustion chamber to excite selected resonance modes, detecting said selected resonance modes, measuring the magnitude of loss tangent by means of said selected resonance mode, identifying said measured magnitudes of loss tangent with the position of electric fields of said selected resonance modes, comparing measured magnitude of said loss tangent of said selected resonant modes with the loss tangent of the same resonance modes occurring during rotation of the engine in the absence of fuel.

7. The method of selecting one resonance mode for the purpose of measurement from many possible resonance modes that can be excited within the combustion chamber of an internal combustion engine, at all available r.p.m., by the radiation of a externally controlled coherent ultrahigh and microwave radio frequency generator, comprising the steps of generating a fixed radio frequency wavelength, radiating said wavelength into said combustion chamber, turning said fixed wavelength power "on" and "off" in synchronism with the revolution of said engine, said power being turned "on" only during the time of the selected resonance.

8. The method of measuring ignition angle in the combustion chamber of an internal combustion engine, at all available r.p.m., comprising the steps of generating an externally controlled coherent ultrahigh and microwave radio frequency wavelength, tuning said wavelength to excite one resonance mode in said combustion chamber, radiating said wavelength into said combustion chamber, detecting one direction resonance mode of piston of said radio frequency wavelength, and measuring elapsed time between ignition and said resonance mode.

9. The method of determining the direction of piston motion within the combustion chamber of an internal combustion engine, at all available r.p.m. comprising the steps of generating an externally controlled coherent ultrahigh and microwave radio frequency wave, radiating said wave into said combustion chamber, changing the wavelength of said wave to excite a resonance mode of said wave, detecting said resonance mode coupled out in the form in which initially the resonance has one detected polarity followed by the opposite polarity, when the piston moves in one direction, having the reverse sequence in time of polarities when the piston moves in the opposite direction, comparing the sequence of polarity reversals with those taken as a calibration by moving the piston very slowly as a standard.

10. The method of determining engine crank angular velocity at all available r.p.m. comprising the steps of generating an externally controlled coherent ultrahigh and microwave radio frequency wave, radiating said wave into the combustion chamber of internal combustion engines, changing the wavelength of said wave to excite a resonance mode, detecting said resonance mode, measuring the time duration of said resonance, employing said time duration to determine engine angular velocity.

11. The method of tracking one resonance in the combustion chamber of an internal combustion engine at all available r.p.m., comprising the steps of generating an externally controlled ultrahigh and microwave frequency wave, radiating said wave into said combustion chamber, changing the wavelength of said wave to excite a resonance mode, detecting said resonance mode, amplifying said detected resonance mode, turning the amplifier "on" during the time of occurrence of said resonance mode one time per engine cycle, and "off" during all other times, measuring the average value of the voltage comprising the resonance mode during said "on" time, determining that zero average value identifies the coincidence of the "on" time with the time of resonance, other polarities measured identify the polarity of anticoincidence of the "on" time with the time of resonance, employing this measurement to automatically alter said time of "on" to maintain coincidence of "on" time with the time of resonance.

12. The method of controlling internal combustion engine operating efficiency at all available r.p.m., comprising the steps of generating an externally controlled coherent ultrahigh and microwave radio frequency wave, radiating said wave into the combustion chamber of said engine, changing the wavelength of said wave to excite a selected resonance mode, further changing the wavelength of said wave to position the time of occurrence of said resonance mode in a sensitive region of gas conductivity, continuously measuring the loss tangent of materials by said resonance mode, employing said measurement to control the efficiency of operation of the internal combustion engine.